US006486767B1

United States Patent
Rainey

(10) Patent No.: US 6,486,767 B1
(45) Date of Patent: Nov. 26, 2002

(54) ROTARY POSITION SENSOR USING A STRAIN GAGE

(75) Inventor: Robert R. Rainey, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/917,362

(22) Filed: Jul. 27, 2001

(51) Int. Cl.[7] ................................................ G01B 7/16
(52) U.S. Cl. ............................ 338/6; 338/2; 338/13; 338/47
(58) Field of Search ................ 338/13, 79, 2, 338/5, 6, 47, 39, 114; 73/862.474, 862.627

(56) References Cited

U.S. PATENT DOCUMENTS

| | | | |
|---|---|---|---|
| 2,467,752 A | * | 4/1949 | Howe ............................... 338/2 |
| 2,660,652 A | * | 11/1953 | Greene ............................ 338/2 |
| 3,307,100 A | * | 2/1967 | Reason et al. ................... 338/5 |
| 3,664,203 A | | 5/1972 | Pataki |
| 4,033,360 A | * | 7/1977 | Nienow et al. ............. 131/84.1 |
| 4,567,377 A | | 1/1986 | Amlani |
| 4,655,091 A | * | 4/1987 | Greenwood ..................... 338/5 |
| 4,691,117 A | | 9/1987 | Greenwood |
| 5,233,882 A | | 8/1993 | Byram |
| 5,325,081 A | * | 6/1994 | Roberts .......................... 338/2 |
| 5,767,840 A | * | 6/1998 | Selker ............................ 338/6 |
| 6,085,053 A | | 7/2000 | Sacki |

FOREIGN PATENT DOCUMENTS

FR 2432704 * 2/1980

OTHER PUBLICATIONS

English translation of Parcellier, FR 2,432,704 (Feb. 1980).*
Standard Handbook for Electrical Eng. D. Fink & Beaty. P22.2 (19 . . . ).*

* cited by examiner

Primary Examiner—Karl D. Easthom
(74) Attorney, Agent, or Firm—Mark P. Bourgeois

(57) ABSTRACT

A rotary position sensor for sensing the position of an attached object. The sensor uses a strain gage to detect the position of the object. The sensor includes a housing and a helical shaped actuator located in the housing. The actuator is attachable to the object. A strain gage is positioned in contact with the actuator. The actuator applies a strain to the strain gage as the actuator is moved. The strain gage generates an electrical signal that is proportional to the position of the object.

4 Claims, 2 Drawing Sheets

ROTARY POSITION SENSOR USING A STRAIN GAGE

CROSS REFERENCE TO RELATED APPLICATIONS

The application is related to the following U.S. patent applications:

Ser. No. 09/783,440 filed Feb. 14, 2001 and entitled, "Rotary Position Sensor Using a Strain Gage".

Ser. No. 09/902137, filed Jul. 10, 2001 and entitled, "Linear Position Sensor Using a Strain Gage".

BACKGROUND OF THE INVENTION

1. Field of the Invention

This invention pertains to position sensors which are both durable and precise for application in rugged and demanding environments, particularly for application with internal combustion engines.

2. Description of the Prior Art

There are a variety of known techniques for position sensing. Optical, resistive, electrical, electrostatic and magnetic fields are all used with apparatus to measure position. There are many known apparatus for using these energies for sensing. A few of the known apparatus are resistive contacting sensors, inductively coupled ratio detectors, variable reluctance devices, capacitively coupled ratio detectors, optical detectors using the Faraday effect, photo-activated ratio detectors, radio wave directional comparators, and electrostatic ratio detectors. There are many other known detectors, too numerous to mention herein.

These detection methods tend to each offer much value for one or more applications, but none meet all application requirements for all position sensing applications. The limitations may be due to cost, sensitivity to particular energies and fields, resistance to contamination and environment, stability, ruggedness, linearity, precision, or other similar factors. Transportation applications generally, and specifically automotive applications, are very demanding. Temperatures may rise to 150 degrees Centigrade or more, with road contaminants such as salt and dirt splashing upon the engine compartment. This may occur while the engine is still extremely hot from operation. At the other extreme, an engine is expected to perform in the most northern climates without fault, and without special preheating.

Presently, most throttle valve position sensors are manufactured using a resistive sensor combined with a rotating contactor structure. The contact serves to "tap" the resistor element and provide a voltage proportional to position. The resistive sensor has proven to offer the greatest performance for cost in throttle position sensing applications, unmatched by any other technology to date. However, the resistive position sensors are not without limitations. An automotive position sensor must endure many millions or even billions of small motions referred to in the industry as dithers. These dithers are the result of mechanical motion and vibration carried into the position sensor. Additionally, during the life of a position sensor, there may be a million or more full stroke cycles of motion. In resistive sensors, these motions can affect signal quality. In spite of this shortcoming, most position sensors are resistive sensors. Over the years, efforts at improving the contactor-element interface have vastly improved the performance of these devices. Similar improvements in packaging a and production have maintained cost advantage. A replacement component must be able to meet position sensor performance requirements while offering similar price advantage.

The combination of temperature extremes and contamination to which an automotive sensor is exposed causes the industry to explore very rugged and durable components. One particular group of sensors, those which utilize magnetic energy, have been developed for these demanding applications. This is because of the inherent insensitivity of the magnetic system to contamination, together with durability characteristic of the components. However, magnetic position sensors have issues with linearity and maintaining tolerances.

Typical magnetic sensors use one or a combination of magnets to generate a field across an air gap. The magnetic field sensor, be this a Hall effect device or a magnetoresistive material or some other magnetic field sensor, is then inserted into the gap. The sensor is aligned centrally within the cross-section of the gap. Magnetic field lines are not constrained anywhere within the gap, but tend to be most dense and of consistent strength centrally within the gap. Various means may be provided to vary the strength of the field monitored by the sensor, ranging from shunting the magnetic field around the gap to changing the dimensions of the gap. Regardless of the arrangement and method for changing the field about the sensor, the magnetic circuit faces several obstacles which degrade the performance of magnetic position sensors. Movement of the sensor relative to the gap, which is the result of axial play, will lead to a variation in field strength measured by the sensor. This effect is particularly pronounced in Hall effect, magneto-resistive and other similar sensors, where the sensor is sensitive about a single axis and insensitive to perpendicular magnetic fields. The familiar bulging of field lines jumping a gap illustrates this, where a Hall effect sensor not accurately positioned in the gap will measure the vector fraction of the field strength directly parallel to the gap. In the center of the gap, this will be equal to the full field strength. The vector fraction perpendicular thereto will be ignored by the sensor, even though the sum of the vectors is the actual field strength at that point. As the sensor is moved from the center of the gap, the field begins to diverge, or bulge, resulting in a greater fraction of the field vector being perpendicular to the gap. Since this will not be detected by the sensor, the sensor will provide a reading of insufficient magnitude.

In addition to the limitations with regard to position and field strength, another set of issues must be addressed. A position sensor of value in the transportation industry must be precise in spite of fluctuating temperatures. In order to gain useful output, a magnet must initially be completely saturated. Failure to do so will result in unpredictable magnet performance. However, operating at complete saturation leads to another problem referred to in the trade as irreversible loss. Temperature cycling, particularly to elevated temperatures, permanently decreases the magnetic output. A magnet also undergoes aging processes not unlike those of other materials, including oxidation and other forms of corrosion. This is commonly referred to as structural loss. Structural and irreversible loss must be understood and dealt with in order to provide a reliable device with precision output. Another significant challenge in the design of magnetic circuits is the sensitivity of the circuit to surrounding ferromagnetic objects. For transportation applications a large amount of iron or steel may be placed in very close proximity to the sensor. The sensor must not respond to this external influence.

A current unmet need exists for a rotary position sensor that is not subject to wear, and contamination problems, and that is accurate, reliable and can be produced at a low cost. The preferred embodiment of the invention is designed to solve the problems herein described and other problems not discussed, which are discoverable by a skilled artisan.

SUMMARY OF THE INVENTION

It is a feature of the invention to provide a rotary position sensor for sensing the position of an attached object. The rotary position sensor uses a strain gage to detect the position of the object.

Yet, another feature of the invention is to provide a position sensor for sensing the position of an attached object. The sensor includes a housing and a helical actuator attachable to the object and positioned in the housing. A strain gage is positioned in the housing adjacent the actuator. The actuator contacts the strain gage and applies strain thereto. The strain gage generates an electrical signal that is proportional to the position of the object. Several terminals are attached to the housing and electrically connected to the strain gage.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention.

Figure 1:
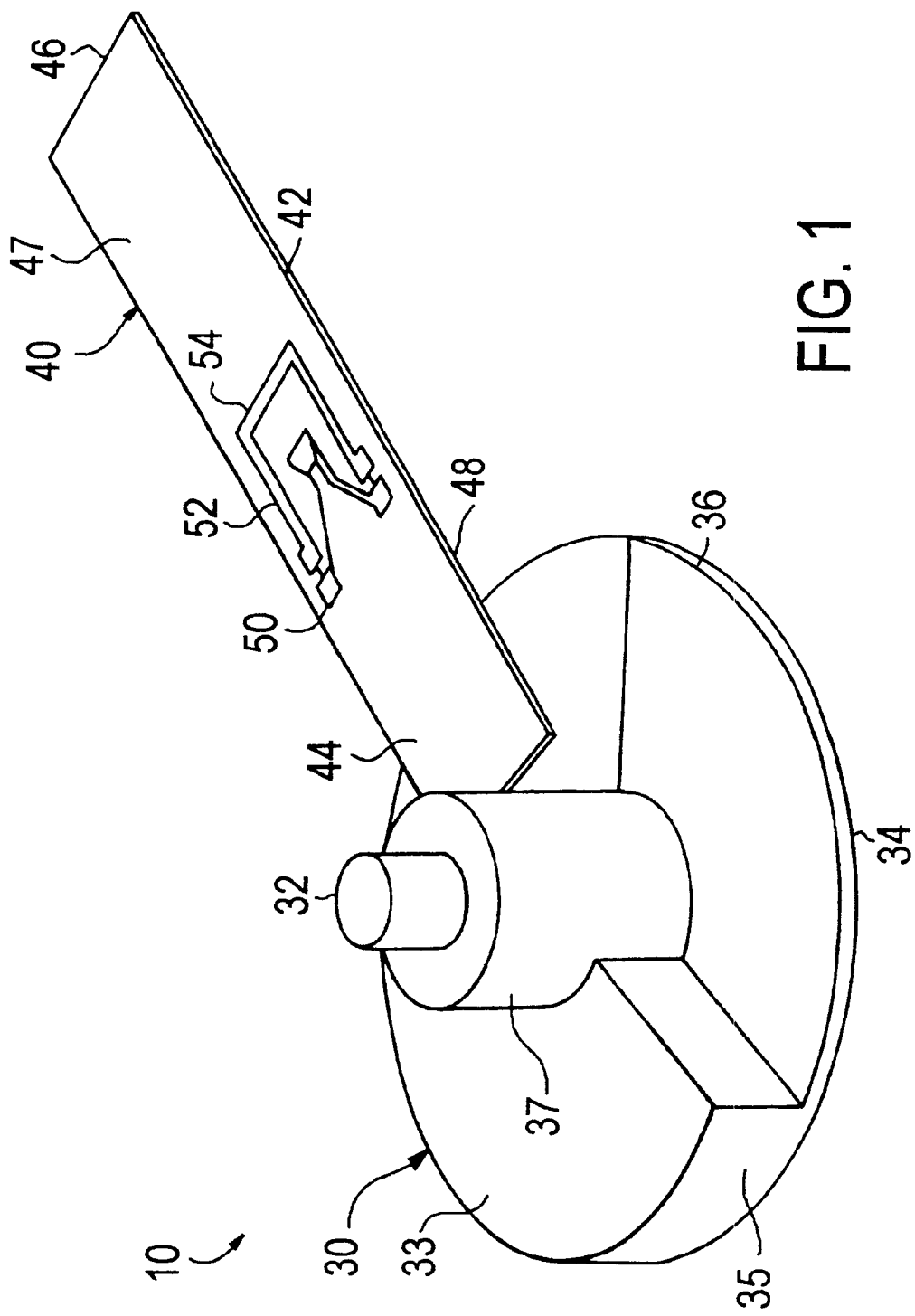
FIG. 1 is a perspective view of the preferred embodiment of a Rotary Position Sensor Using a Strain Gage with the housing removed.

It is noted that the drawings of the invention are not to scale. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT(s)

Rotary Position Sensor

Figure 2:
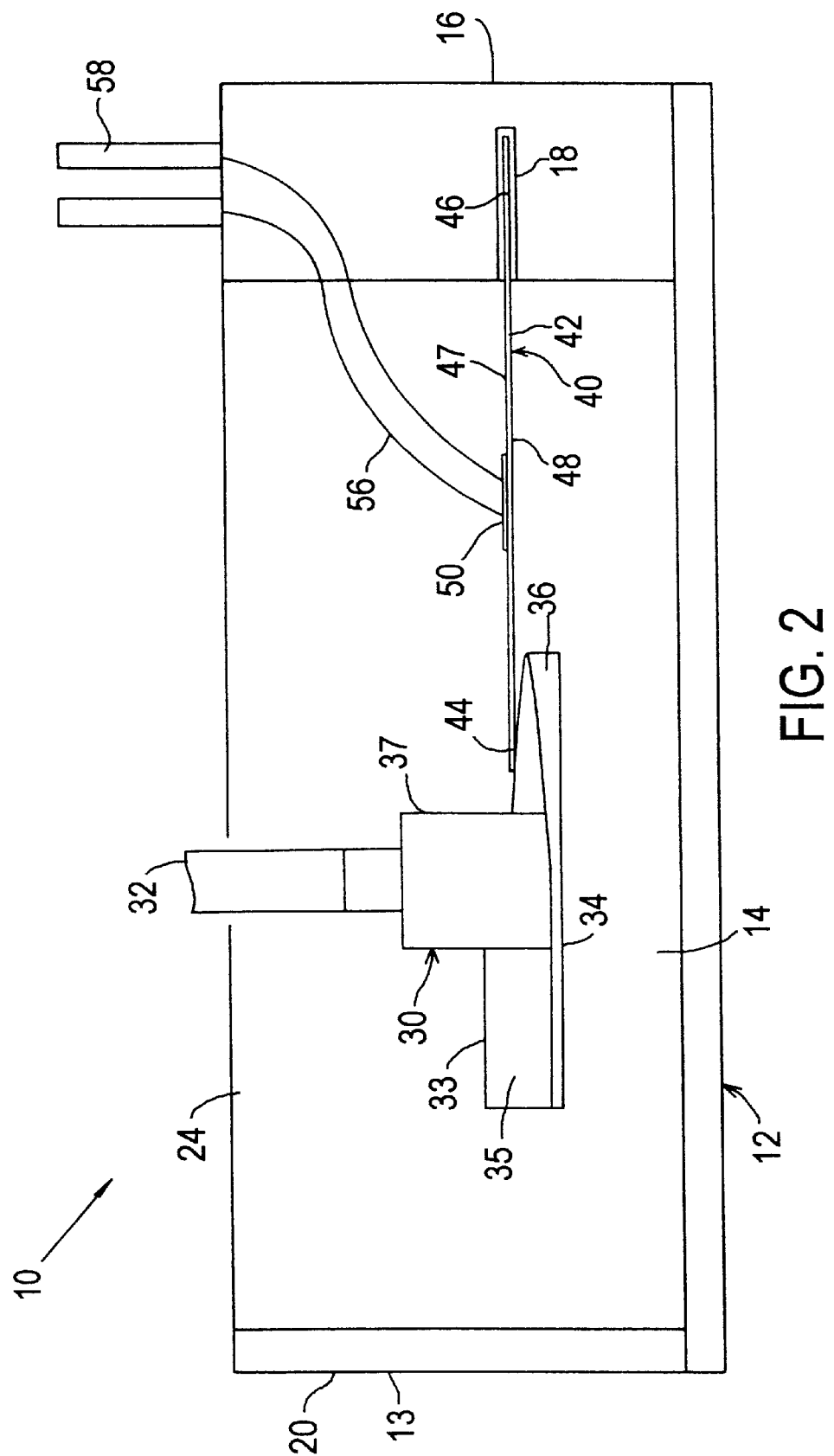
FIG. 2 is a cross-sectional view of FIG. 1 with the housing.

Referring to FIGS. 1 and 2, a preferred embodiment of a rotary position sensor using a strain gage 10 is shown. A housing 12 has outer walls 13 that define a cavity 14. Housing 12 has an end 16 with a slot 18 and an end 20. A cover 24 is mounted over housing 12 to seal cavity 14. Housing 12 and cover 24 can be formed from injection molded plastic. Cover 24 is ultrasonically welded or heat staked to housing 12 to seal the sensor 10.

An helical actuator 30 is mounted in cavity 14. Actuator 30 has an attached shaft 32. Actuator 30 has an upper surface 33 and a lower surface 34. Actuator 30 has a thick region 35 and a thin region 36. Moving from the thin region 36 to the thick region 35, the upper surface 33 slopes upwardly as one moves clockwise around the helical actuator 30. Actuator 30 also has a hub 37 that is attached to shaft 32. Shaft 32 is attachable to an object whose position is desired to be measured such as a throttle position valve. A sensor or strain gage 40 is located inside cavity 14. Sensor 40 has a substrate 42 with ends 44 and 46, an upper surface 47 and a lower surface 48. End 46 is press fit into slot 18 in order to hold the sensor. Substrate 42 is preferably formed from 430 stainless steel. Several resistors 50 are mounted on upper surface 47. Resistors 50 are strain sensitive and are preferably arranged in a wheatstone bridge configuration. Strain sensitive resistors 50 are preferably conventional thick film resistors. Details of the manufacture and design of strain gage 40 is disclosed in U.S. Pat. No. 6,161,891, issued Dec. 19, 2000 and entitled, "Vehicle Seat Weight Sensor", the contents of which are herein included by reference in entirety. The strain sensitive resistors 50 are connected by circuit lines 52 to a bond pad 54. Bond pad 54 is connected to terminals 58 by wires 56. Wires 56 may be attached to the pad and terminals by conventional methods such as soldering or ultrasonic wire bonding. Terminals 58 are located in the cover 24 for connecting with an external electrical connector (not shown) that would be connected to an external circuit. Only two terminals are shown, more or less may be required. Terminals 58 may be molded in cover 24 or inserted by pressing.

Operation

Rotary position sensor using a strain gage 10 operates as follows: shaft 32 is attached to an external device whose position is desired to be sensed. As shaft 32 rotates clockwise, upper surface 33 slides on substrate end 44 causing substrate 42 to flex or bend upwardly. An external voltage is applied to some of terminals 58 and flows through resistors 50. As the substrate flexes, the force on end 44 causes strain to be applied to the resistors 50. The strain in resistors 50 causes their electrical resistance to change and subsequently the voltage drop across the resistors to change. The resistors are connected in a Wheatstone bridge configuration. The electrical output signal from the bridge is connected to another terminal 58 which can connect with an external electrical connector such as a wiring harness. Thus, as the shaft rotates, an electrical signal is generated that is indicative of the position of the attached object. Similarly, when the actuator 30 moves counterclockwise, the strain on resistors 50 will be reduced and the electrical signal will change accordingly.

While, the sensor has been shown with a housing 12, it is contemplated to omit housing 12. The actuator 30 could be formed directly as a part of a structure whose position is desired to be sensed. For example, actuator 30 could be molded directly onto the end of an electric motor. It is noted that the shape of the actuator can vary.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed is:

1. A position sensor for sensing the position of an attached object, comprising:

a) a helical ramp, having a thick region and a thin region;

b) a strain gage in contact with the ramp, the strain gage generating an electrical signal that is proportional to the position of the object, the strain gage having a substrate with at least one strain sensitive resistor disposed thereon, the strain increasing on the substrate as the ramp moves from being in contact with the substrate at the thin region to being in contact with the thick region.

2. The position sensor according to claim 1, wherein a shaft is attached between the object and the ramp.

3. The position sensor according to claim 1, wherein the substrate has a first and second end and the housing has a slot, the first end mounted in the slot.

4. A position sensor for sensing the position of an object, comprising:
   a) a housing having a slot;
   b) a helical shaped actuator, attachable to the object and positioned in the housing;
   c) a strain gage positioned in the housing, adjacent the actuator, the actuator contacting the strain gage and applying strain thereto, the strain gage generating an electrical signal that is proportional to the position of the object, the strain gage having four strain sensitive resistors connected in a wheatstone bridge;
   d) a plurality of terminals attached to the housing and electrically connected to the strain gage; and
   e) the actuator having an upper surface and the strain gage having a first and second end, the second end in contact with the upper surface and the first end of the strain gage mounted in the slot.

* * * * *